United States Patent Office 3,791,964
Patented Feb. 12, 1974

---

3,791,964
HYDROCARBON CONVERSION PROCESS EMPLOYING A CRYSTALLINE ALUMINOSILICATE AND METHOD OF PREPARING THE SAME
Guenter H. Kuehl, Morrisville, Pa., assignor to Mobil Oil Corporation
No Drawing. Continuation-in-part of application Ser. No. 523,936, Feb. 1, 1966, now Patent No. 3,386,801, which is a continuation-in-part of abandoned application Ser. No. 294,229, July 11, 1963. This application July 5, 1967, Ser. No. 651,108
Int. Cl. B01j *11/82;* C10g *11/04*
U.S. Cl. 208—120                                        8 Claims

ABSTRACT OF THE DISCLOSURE

As a new zeolite, a crystalline aluminosilicate having a crystal structure similar to zeolite A but a silica/alumina mol ratio higher than zeolite A, prepared from a mixed sodium tetramethylammonium system containing phosphate.

---

CROSS-REFERENCES TO RELATED APPLICATIONS

This application is a continuation-in-part of copending application Ser. No. 523,936, filed Feb. 1, 1966, now U.S. Pat. 3,386,801, which is in turn a continuation-in-part of Ser. No. 294,229, filed July 11, 1963, and now abandoned.

BACKGROUND OF THE INVENTION

(1) Field of the invention

This invention relates to novel crystalline aluminosilicates and to methods for their preparation.

(2) Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the shearing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. They are ordinarily prepared initially in the sodium or potassium form of the crystal, the process of preparation involving heating, in aqueous solution, an appropriate mixture of oxides, or of materials whose chemical composition can be completely represented as a mixture of oxides $Na_2O$, $Al_2O_3$, $SiO_2$ and $H_2O$, at a temperature of approximately 100° C. for periods of 15 minutes to 90 hours or more. The product which crystallizes within this hot mixture is separated therefrom and water washed until the water in equilibrium with the aluminosilicate has a pH in the range of 9 to 12. The aluminosilicate may then be activated by heating until dehydration is attained. These aluminosilicates have come to be designated by letter or other convenient symbol, as illustrated by zeolite A (U.S. 2,882,243), zeolite X (U.S. 2,882,244), zeolite K–G (U.S. 3,055,654), and zeolite ZK–5 (U.S. 3,247,-195), merely to name a few.

SUMMARY OF THE INVENTION

The present invention relates to a novel synthetic crystalline aluminosilicate hereinafter designated as "zeolite ZK–22" and to methods for its preparation. Zeolite ZK–22 has a crystal structure similar to zeolite A, but a silica to alumina mol ratio higher than zeolite A, ranging from about 2 to about 7. It is prepared from a mixed sodium-tetramethyl-ammonium system containing phosphate and the resultant crystallized product contains zeolitic tetramethylammonium ions along with sodium as well as intercalated phosphate.

DESCRIPTION OF SPECIFIC EMBODIMENTS

Zeolite ZK–22 has a crystal structure similar to zeolite A, which is described in above-mentioned U.S. 2,882,243. The lattice parameter decreases with increasing silica to alumina mol ratios. Although ZK–22 is structurally similar to zeolite A, there are a number of significant differences between the two. ZK–22 has a silica to alumina mol ratio ranging from about 2 to 7, whereas zeolite A has been obtainable in the prior art, only at silica to alumina mol ratios of about 2.35 or less, down to about 1.35. As mentioned above, ZK–22, unlike zeolite A, contains intercalated phosphate when crystallized from its reaction mixture. Another difference between the subject zeolite and sodium zeolite A is the ability of sodium ZK–22, in one of the specific embodiments of this invention, i.e., at silica to alumina mol ratios above about 2.8, unlike sodium zeolite A, to sorb straight chain hydrocarbons of any length while excluding branched-chain and cyclic hyrocarbons, the smallest of which that are not sorbed, for example, being isobutane and cyclopentane. A zeolite of type A structure sorbs straight-chain hydrocarbons if the number of cations per unit cell is 10 or less. For the sodium form, this corresponds to a silica to alumina molar ratio of 2.80. Zeolite ZK–22 of lower $SiO_2/Al_2O_3$ molar ratios can still sorb straight-chain hydrocarbons, e.g. n-hexane, if the number of thermally stable cations per unit cell is not greater than 10. The framework structure of zeolite ZK–22 excludes branched-chain or cyclic hydrocarbons.

Unlike zeolites A and ZK–21, described in copending U.S. application Ser. No. 565,715, filed July 18, 1966, now U.S. Pat. 3,436,189, and like zeolite ZK–4, described in U.S. 3,314,752, zeolite ZK–22 contains zeolitic tetramethylammonium ions along with sodium. Like zeolite ZK–21 and unlike zeolite ZK–4, zeolite ZK–22 contains intercalated phosphate. Zeolites ZK–21 and ZK–22 can be easily distinguished by a calcination test. ZK–22 cokes due to the decomposition of tetramethylammonium ions as does zeolite ZK–4 while no coking occurs when zeolite ZK–21 is calcined.

The composition of zeolite ZK-22 may, in its dehydrated form, be expressed in terms of approximate mol ratios of oxides as follows:

$$1.0 \pm 0.2[(1-x)[(CH_3)_4N]_2O: xM_{2/n}O]: Al_2O_3: YSiO_2: ZP_2O_5$$

wherein M represents a metal cation or a positive ion, $n$ is the valence thereof, Y is 2 to 7, and Z is 0.01 to $Y+2/48$.

As initially prepared from the reaction mixture ZK-22 crystallizes in the mixed tetramethylammonium and sodium form. Sodium metasilicate and waterglass are preferred sources of silica, however, other silica sources such as colloidal silica sol may be used satisfactorily. Aluminum, introduced as sodium aluminate or aluminum phosphate, is complexed by phosphate ions in order to decrease the concentration of hydroxyaluminate ions as described in copending application, Ser. No. 523,936, heretofore identified. The cation source is a combination of sodium and tetramethylammonium ions, the latter being introduced as hydroxide or phosphate.

Zeolite ZK-22 may be prepared from a reaction mixture having the following reactions expressed in mol ratios: $SiO_2/Al_2O_3$ between about 2 and 10, preferably about 3 to 8; $P_2O_5/Al_2O_3$ at least about 2, preferably about 4; $Na_2O/Na_2O+[(CH_3)_4N]_2O)$ between about 0.05 and 0.5, preferably 0.1 to 0.4;

$$(Na_2O+[(CH_3)_4N]_2O)/P_2O_5$$

at least about 2.4 preferably about 2.5 to 4. Of great importance is the ratio $(Na_2O+[(CH_3)_4N]_2O)/P_2O_5$ which determines the position of the equilibrium $$[Al(PO_4)_2]^{3-} + 4OH^- \rightleftharpoons [Al(OH)_4]^- + 2PO_4^{3-}$$

The lower this ratio is for a given $SiO_2/Al_2O_3$ ratio of the reaction mixture, the higher will be the $SiO_2/Al_2O_3$ ratio of the crystalline product. This ratio, which is a measure for the alkalinity of the system, has been investigated in the range 2.4 to 4.1. At 2.4 no crystallization occurred, but at 2.5 a pure zeolite ZK-22 was obtained. There is probably no distinct upper limit, because a high ratio can be compensated by a greater dilution. In order to yield an A-type product, high $SiO_2/Al_2O_3$ mixture ratios require higher $(Na_2O+[(CH_3)_4N]_2O)/P_2O_5$ ratios, thus offsetting the advantage of high $SiO_2/Al_2O_3$. However, it has been shown that mixture ratios of $SiO_2/Al_2O_3$ up to 6.0 are sufficient to obtain high silica products. Although $P_2O_5/Al_2O_3$ is stated as preferably about 4, this is not critical, since large excesses of $PO_4^{3-}$ ions can be compensated for by raising the reaction pH.

Zeolite ZK-22 is synthesized by the complexing technique, as mentioned above, described in copending application Ser. No. 523,936. That application described a procedure whereby crystalline aluminosilicates having higher $SiO_2/Al_2O_3$ ratios than would otherwise be attainable with a given starting mixture may be synthesized through the utilization of a reaction mixture containing a complex which serves to regulate the quantity of alumina available to form the desired aluminosilicate. It was pointed out therein that the $SiO_2/Al_2O_3$ ratio in the crystalline aluminosilicate product bore a direct relationship to the quantity of complex hydroxoaluminate ions $[Al(OH)_4]^-$ in the reaction mass with a given concentration of $SiO_2$. Though a variety of complexing agents were mentioned in said copending application Ser. No. 523,936 as suitable for the complexing function in question, the phosphatoaluminate complex was indicated to be the most desirable and effective. Such phosphatoaluminate complex and the mechanism by which it works is employed for synthesizing the zeolite ZK-22 of the present invention.

The size of the anionic species in solution during the crystallization of a zeolite is dependent on the pH of the solution. The higher the pH, the smaller are the anionic species; the lower the pH, the larger are the anionic species. Also, the lower the pH, the more different anionic species are present in significant amounts and in equilibrium with one another. It can be expected that the zeolite A structure is formed at a higher pH than the faujasite structure under otherwise identical conditions. This seems to be the case. However, when the crystallizing structure changes from X to A, the pH is so high that the silica to alumina ratio of the resulting zeolite is low. A higher $SiO_2/Al_2O_3$ ratio of the zeolite A structure has not been obtained by this procedure.

When a zeolite crystallizes, the number of cationic charges incorporated in the zeolite structure is equal to the number of aluminum atoms in the zeolite framework. Obviously, if only a small number of cations are available, the amount of aluminum being included in the zeolite framework is limited.

So by using cations which are not as easily incorporated effectively as sodium ions because of their size, presumably, the number of cations available for the zeolite crystallization can be limited without effecting the pH of the reaction mixture, which is above about 11.

The invention will be further described in conjunction with the following specific examples which are deemed not to be limitative but merely illustrative of the invention.

As a first example, metasilicate is used at a $SiO_2/Al_2O_3$ molar ratio of the mixture of 4.0:

EXAMPLE 1

Aluminum phosphate dihydrate, 1.98 g. (12.5 millimoles), was dissolved in a mixture of 38 g. of a 25% aqueous solution of tetramethylammonium hydroxide and 5.75 g. phosphoric acid (85%) with slight warming. Traces of insoluble material were filtered off and the filtrate diluted to 50 ml. with water. A solution of 6.88 g. (25 millimoles) of sodium metasilicate (24.55% $Na_2O$; 21.9% $SiO_2$) in 20 ml. of water was added with stirring. The mixture was placed in a bath at constant temperature of 90° C. After 35 days the crystallization was complete. The product was filtered and washed with water.

The composition of the reaction mixture is summarized as follows:

Molar ratio:
| | |
|---|---|
| $SiO_2/Al_2O_3$ | 4.0 |
| $Na_2O/Al_2O_3$ | 4.26 |
| $Na_2O/(Na_2O+[(CH_3)_4N]_2O)$ | 0.338 |
| $(Na_2O+[(CH_3)_4N]_2O)/P_2O_5$ | 2.54 |
| $P_2O_5/Al_2O_3$ | 4.96 |
| $H_2O/(Na_2O+[(CH_3)_4N]_2O)$—ca. | 49. |

The properties of the product were:

Ignited weight basis: Wt. percent
| | |
|---|---|
| $SiO_2$ | 58.5 |
| $Al_2O_3$ | 25.2 |
| $Na_2O$ | 14.7 |

Air dried weight basis:
| | |
|---|---|
| C | 3.65 |
| N | 0.94 |
| P | 0.87 |
| Ash | 78.6 |
| $SiO_2/Al_2O_3$ | 3.94 |
| $Na_2O/Al_2O_3$ | 0.96 |

Crystal structure—ZK-22.
Sorption, g./100 g. of zeolite.[1]:
| | |
|---|---|
| Cyclohexane | 1.3 |
| n-Hexane | 12.4 |
| Water | 24.2 |

[1] The sorption data were measured at 20 mm. Hg for cyclohexane and n-hexane and at 12 mm. Hg for water.

Like zeolite ZK-21, zeolite ZK-22 contains not only intercalated phosphate, but also non-zeolite nitrogenous cations. Therefore, only a part of the nitrogen and carbon found is present as zeolitic tetramethylammonium ions.

Colloidal silica sol can also be used as the silica source as shown in the next example.

EXAMPLE 2

Sodium aluminate, 1.47 g. (43.3% $Al_2O_3$; 37.7% $Na_2O$), equivalent to 6.25 millimoles of $Al_2O_3$, was dissolved in 57 g. of a 25% solution of tetramethylammonium hydroxide and 5.75 g. of an 85% phosphoric acid. The volume was adjusted to 65 ml. and 4.75 g. of a colloidal silica sol (31.5% $SiO_2$), diluted with 15 ml. of water, added with stirring. No gel formed immediately. The flask with the reaction mixture was placed in a bath at 90° C. After 4 days the crystallization was complete.

The composition of the reaction mixture is summarized as follows:

Molar ratio:
| | |
|---|---|
| $SiO_2/Al_2O_3$ | 4.0 |
| $Na_2O/Al_2O_3$ | 1.43 |
| $Na_2O/(Na_2O+[(CH_3)_4N]_2O)$ | 0.103 |
| $(Na_2O+[(CH_3)_4N]_2O)/P_2O_5$ | 3.49 |
| $P_2O_5/Al_2O_3$ | 3.98 |
| $H_2O/Na_2O+[(CH_3)_4N]_2O$—ca. | 51. |

The properties of the product were:

| Ignited weight basis: | Wt. percent |
|---|---|
| $SiO_2$ | 49.9 |
| $Al_2O_3$ | 31.3 |
| $Na_2O$ | 17.65 |
| Air dried weight basis: | |
| C | 3.23 |
| N | 0.87 |
| P | 0.44 |
| Ash | 77.1 |
| $SiO_2/Al_2O_3$ | 2.71 |
| $Na_2O/Al_2O_3$ | 0.93 |

Crystal structure—ZK-22; $a_0$ [1] $=12,237\pm0.02$.

Sorption, g./100 g. of zeolite:
| | |
|---|---|
| Cyclohexane | 0.58 |
| n-Hexane | 13.5 |
| Water | 27.0 |

[1] $a_0$=lattice parameter.

Although the product contains only between 9 and 10 sodium ions per unit cell, this is sufficient to considerably reduce the rate of sorption for n-hexane, as the following data demonstrate:

| Sorption after (hours): | G./100 g. of zeolite |
|---|---|
| 3 | 11.4 |
| 5 | 11.9 |
| 7 | 12.3 |
| 23 | 13.5 |

In order to obtain an even lower $SiO_2/Al_2O_3$ ratio product, the silica to alumina ratio of the mixture was reduced to 3, as demonstrated in the next example.

EXAMPLE 3

A solution of 1.47 g. of sodium aluminate, 57 g. of a 25% solution of tetramethylammonium hydroxide and 5.75 g. of an 85% phosphoric acid was prepared as in the previous example, and the volume adjusted to 60 ml. A mixture of 3.57 g. of colloidal silica sol (31.5% $SiO_2$) and 25 ml. of water was added with stirring. No gel formed immediately. The mixture was placed in the bath at 90° C. After 4 days the crystallization was complete.

The composition of the reaction mixture is summarized as follows:

Molar ratio:
| | |
|---|---|
| $SiO_2/Al_2O_3$ | 3.0 |
| $Na_2O/Al_2O_3$ | 1.43 |
| $Na_2O/(Na_2O+[(CH_3)_4N]_2O)$ | 0.103 |
| $(Na_2O+[(CH_3)_4N]_2O)/P_2O_5$ | 3.49 |
| $P_2O_5/Al_2O_3$ | 3.98 |
| $H_2O/(Na_2O+[(CH_3)_4N]_2O)$—ca. | 54. |

The properties of the product were:

| Ignited weight basis: | Wt. percent |
|---|---|
| $SiO_2$ | 46.9 |
| $Al_2O_3$ | 33.6 |
| $Na_2O$ | 18.6 |
| Air dried weight basis: | |
| C | 3.17 |
| N | 0.75 |
| P | 0.45 |
| Ash | 77.2 |
| $SiO_2/Al_2O_3$ | 2.38 |
| $Na_2O/Al_2O_3$ | 0.91 |

Crystal structure—ZK-22; $a_0=12.253\pm0.02$.

Sorption, g./100 g. of zeolite:
| | |
|---|---|
| n-Hexane (18 hours) | 9.82 |
| Water | 24.6 |

This zeolite contains exactly 10 sodium ions per unit cell. The sorption is, therefore, considerably hindered, so that even after 18 hours only 9.82 g. of n-hexane were sorbed per 100 g. of zeolite.

Products of somewhat higher silica to alumina ratios were obtained when the $SiO_2Al_2O_3$ ratio of the mixture was increased to 6.0, as shown in the next example.

EXAMPLE 4

A solution of the same amounts of sodium aluminate, tetramethylammonium hydroxide, phosphoric acid and water as in Example 3 was prepared and 7.15 g. of colloidal silica sol (31.5% $SiO_2$), diluted to 20 ml. with water, added with stirring. No gel formed immediately. The flask with the reaction mixture was placed in a bath at 90° C. After 8 days the crystallization was complete.

The composition of the reaction mixture can be summarized as follows:

Molar ratio:
| | |
|---|---|
| $SiO_2/Al_2O_3$ | 6.0 |
| $Na_2O/Al_2O_3$ | 1.43 |
| $Na_2O/(Na_2O+[(CH_3)_4N]_2O)$ | 0.103 |
| $(Na_2O+[(CH_3)_4N]_2O)/P_2O_5$ | 3.49 |
| $P_2O_5/Al_2O_3$ | 3.98 |
| $H_2O/(Na_2O+[(CH_3)_4N]_2O)$—ca. | 51. |

The two properties of the product were:

| Ignited weight basis: | Wt. percent |
|---|---|
| $SiO_2$ | 53.5 |
| $Al_2O_3$ | 29.8 |
| $Na_2O$ | 16.0 |
| Air dried weight basis: | |
| C | 4.37 |
| N | 1.05 |
| P | 0.41 |
| Ash | 76.2 |
| $SiO_2/Al_2O_3$ | 3.05 |
| $Na_2O/Al_2O_3$ | 0.88 |

Crystal structure—ZK-22.

Sorption, g./100 g. of zeolite:
| | |
|---|---|
| n-Hexane | 13.4 |
| Water | 26.3 |

Waterglass was used as the silica source in the following example.

EXAMPLE 5

The same solution of sodium aluminate, tetramethylammonium hydroxide and phosphoric acid as in the previous example was prepared and 10.4 g. of waterglass (8.9% $Na_2O$, 28.7% $SiO_2$), diluted to 20 ml. with water, added with stirring. No immediate gel formation was observed. The reaction mixture was placed at constant temperature of 90° C. After 8 days the crystallization was complete.

The composition of the reaction mixture is summarized as follows:

Molar ratio:
$SiO_2/Al_2O_3$ ---------------------------- 8.0
$Na_2O/Al_2O_3$ ---------------------------- 3.85
$Na_2O/(Na_2O+[(CH_3)_4N]_2O)$ ------------- 0.236
$(Na_2O+[(CH_3)_4N]_2O)/P_2O_5$ ------------ 4.10
$P_2O_5/Al_2O_3$ --------------------------- 3.98
$H_2O/(Na_2O+[(CH_3)_4N]_2O)$—ca. 44.

The properties of the product were:

| Ignited weight basis: | Wt. percent |
|---|---|
| $SiO_2$ | 58.6 |
| $Al_2O_3$ | 24.5 |
| $Na_2O$ | 13.4 |
| Air dried weight basis: | |
| C | 3.57 |
| N | 1.04 |
| P | 0.73 |
| Ash | 77.8 |
| $SiO_2/Al_2O_3$ | 4.06 |
| $Na_2O/Al_2O_3$ | 0.90 |

Crystal structure—ZK-22; $a_0 = 12.096 \pm 0.02$.

Sorption, g./100 g. of zeolite:
Cyclohexane ---------------------------- 0.92
n-Hexane ------------------------------- 13.7
Water ---------------------------------- 25.9

A lower $(Na_2O+[(CH_3)_4N]_2O)/P_2O_5$ ratio of the reaction mixture yields products of higher $SiO_2/Al_2O_3$ ratios. As was shown in Example 1, the product of such a mixture can be of a $SiO_2/Al_2O_3$ ratio close to that of the mixture. By raising the $SiO_2/Al_2O_3$ molar ratio of such a mixture to 6 without changing the ratios $$Na_2O/(Na_2O+[(CH_3)_4N]_2O)$$

and $(Na_2O+[(CH_3)_4N]_2O)/P_2O_5$ significantly, a product of a higher silica to alumina ratio can be obtained. This was achieved by using a mixture of sodium metasilicate and waterglass as the silica source, as demonstrated in the next example.

EXAMPLE 6

The phosphatoaluminate solution was prepared as in Example 1 and diluted to 45 ml. with water. Then a solution of 5.16 g. (18.75 millimoles) of sodium metasilicate (24.55% $Na_2O$; 21.9% $SiO_2$) and 3.9 g. (18.75 millimoles $SiO_2$) of waterglass (8.9% $Na_2O$; 28.7% $SiO_2$) in 15 ml. of water was added with stirring. A very rigid gel formed. The mixture was placed in a bath at 90° C. After 74 days the crystallization was complete.

The composition of the reaction mixture is summarized as follows:

Molar ratio:
$SiO_2/Al_2O_3$ ---------------------------- 6.0
$Na_2O/Al_2O_3$ ---------------------------- 4.10
$Na_2O/(Na_2O+[(CH_3)_4N]_2O)$ ------------- 0.330
$(Na_2O+[(CH_3)_4N]_2O)/P_2O_5$ ------------ 2.51
$P_2O_5/Al_2O_3$ --------------------------- 4.96
$H_2O/(Na_2O+[(CH_3)_4N]_2O)$—Ca. 43.

The properties of the product were:

| Ignited weight basis: | Wt. percent |
|---|---|
| $SiO_2$ | 66.9 |
| $Al_2O_3$ | 21.3 |
| $Na_2O$ | 10.1 |
| Air dried weight basis: | |
| C | 5.92 |
| N | 1.41 |
| P | 0.58 |
| Ash | 77.4 |
| $SiO_2/Al_2O_3$ | 5.34 |
| $Na_2O/Al_2O_3$ | 0.78 |

Crystal structure—ZK-22; $a_0 = 12.041 \pm 0.02$.

Sorption, g./100 g. of zeolite:
n-Hexane ------------------------------- 14.2
Water ---------------------------------- 25.4

The preparation of Example 6 was scaled up, seeded and crystallized at a slightly higher temperature in order to decrease the crystallization time, as demonstrated in the next example:

EXAMPLE 7

The phosphatoaluminate solution was prepared as in Example 1 using 23.8 g. of aluminum phosphate dihydrate, 456 g. of 25% tetramethylammonium hydroxide solution and 69 g. of 85% phosphoric acid. A small quantity of the ground product of Example 6 was added to the solution before the mixture of 62 g. of sodium metasilicate (24.55% $Na_2O$; 21.9% $SiO_2$) and 46.8 g. of waterglass (8.9% $Na_2O$; 28.7% $SiO_2$) in 180 ml. of water was added. The mixture was placed in a bath at 95° C. After 34 days the crystallization was complete.

The composition ratios of the reaction mixture are the same as in Example 6.

The properties of the product were:

| Ignited weight basis: | Wt. percent |
|---|---|
| $SiO_2$ | 69.5 |
| $Al_2O_3$ | 20.7 |
| $Na_2O$ | 6.74 |
| Air dried weight basis: | |
| C | 6.20 |
| N | 1.53 |
| P | 0.21 |
| Ash | 79.6 |
| $SiO_2/Al_2O_3$ | 5.70 |
| $Na_2O/Al_2O_3$ | 0.54 |

Crystal structure—ZK-22.

Sorption, g./100 g. of zeolite:
Cyclohexane ---------------------------- 0.48
n-Hexane ------------------------------- 14.0
Water ---------------------------------- 25.3

If the crystallization temperature is raised further, the crystallization time is further shortened. It is also shown that higher temperatures yield products of higher $SiO_2/Al_2O_3$ ratios. In the following two examples, reaction mixtures of the same composition as Example 6 are used. The temperature has been varied, and the mixtures have been seeded with the ground product of Example 7, as shown in the next two examples.

| Example | 8 | 9 |
|---|---|---|
| Temperature, ° C | 125 | 150 |
| Crystallization time, weeks | 1 | <1 |
| Product, wt. percent: | | |
| Ignited weight basis: | | |
| $SiO_2$ | 70.9 | 72.3 |
| $Al_2O_3$ | 19.3 | 18.0 |
| $Na_2O$ | 7.4 | 5.8 |
| Air dried weight basis: | | |
| C | 6.48 | 6.73 |
| N | 1.74 | 1.65 |
| P | 0.19 | 0.16 |
| Ash | 80.2 | 80.0 |
| $SiO_2/Al_2O_3$ | 6.24 | 6.82 |
| $Na_2O/Al_2O_3$ | 0.63 | 0.53 |
| Crystal structure | ZK-22 | ZK-22 |
| Sorption, g./100 g. of zeolite: | | |
| Cyclohexane | 0.68 | 0.38 |
| n-Hexane | 14.8 | 13.2 |
| Water | 26.6 | 24.2 |

Comparison of Examples 6 to 9 shows a steady increase of the $SiO_2/Al_2O_3$ ratio of the product with rising temperature of crystallization. This can be explained with a higher concentration of reactive silicate due to better solubility of the gel and a higher degree of depolymerization at higher temperatures.

Ion-exchange, thermal stability and cracking activity

All the sodium ions of zeolite ZK-22 can be exchanged with other cations. The tetramethylammonium ions, however, are too big to pass the 5 A. ports. They can be removed only by calcination under anhydrous conditions, probably leaving a hydrogen behind. This hydrogen can be neutralized with gaseous ammonia. The resulting ammonium ions can then be exchanged. For the preparation of catalysts, however, it is not always necessary to achieve a complete exchange. Frequently acidic sites are desirable. It is, therefore, sufficient for a variety of purposes to replace only the exchangeable cations.

The following data, also serving as examples of the invention, were collected for the evaluation of the catalytic properties of zeolite ZK-22. The sorption capacity was measured after calcination at 550° C. The n-hexane cracking ($\alpha$) activity was determined according to P. B. Weisz and J. N. Miale, J. of Catalysis, 4, 527 (1965).

|   | Percent $La_2O_3$ | Percent residual Na | n-$C_6H_{14}$ sorption | $\alpha$ |
|---|---|---|---|---|
| Lanthanum-exchange: |   |   |   |   |
| Product of Example 1 | 18.1 | 1.1 | 11.6 | 46 |
| Product of Example 5 | 21.1 | 0.79 | 14.5 | 26 |
| Ammonium-exchange* |   |   |   |   |
| Product of Example 1 |   | 0.21 | n.d. | 160 |
| Product of Example 6 |   | 0.39 | 11.9 | 850 |

*Calcined to the hydrogen form following exchange.

The product of Example 7 was exchanged with lanthanum and ammonium in order to prepare a shape-selective cracking catalyst:

| Percent $La_2O_3$ | Percent residual Na | $a_a$ calcined | S  | n-$C_6H_{14}$ | Activity, $\alpha$ |
|---|---|---|---|---|---|
| 0 | 0.14 | 11.97±0.02 |   | 0.46 | 13.5 | 55,000 |
| Same after severe steaming |   |   |   | n.d. | 13.6 | 200 |
| 9.96 | 0.18 | 12.01±0.02 |   | 0.45 | 12.6 | 4,100 |

The crystal structure of ZK-22 is thermally and hydrothermally stable, the high silica material also in the hydrogen form. Zeolite ZK-22 is shape-selective and possesses a three-directional, interconnected channel system, being utilized in shape-selective cracking of straight chain hydrocarbons, e.g., for upgrading of reformate, in a mixture of same with non-straight chain hydrocarbons. It is, therefore, not expected to exhibit diffusion limitations as, e.g., offretite does.

What is claimed is:
1. A solid crystalline aluminosilicate having the composition, in its dehydrated form, expressed in terms of approximate mol ratios of oxides as follows:
$1.0 \pm 0.2[(1-x)[(CH_3)_4N]_2O : xM_{2/n}O]$:
$$Al_2O_3 : YSiO_2 : ZP_2O_5$$
where M is selected from metal cations and positive ions and $n$ is the valence thereof, Y is between about 2 and 7 and Z is between about 0.01 and Y+2/48, $x$ is between about 0.5 and 1, said crystalline aluminosilicate being capable of selectively sorbing straight chain hydrocarbons if the number of thermally stable cations per unit cell is 10 or less from admixture of the same with non-straight chain hydrocarbons.

2. A solid crystalline aluminosilicate according to claim 1, wherein M is sodium and $n$ is 1.

3. A solid crystalline aluminosilicate according to claim 1, wherein M is selected from the rare earth metals and $n$ is 3.

4. A solid crystalline aluminosilicate according to claim 1, wherein the tetramethylammonium ion is substantially replaced by hydrogen.

5. A solid crystalline aluminosilicate according to claim 4, wherein M is selected from the rare earth metals and $n$ is 3.

6. A hydrocarbon conversion process which comprises contacting a hydrocarbon charge under catalytic cracking conditions with the composition of claim 4.

7. A hydrocarbon conversion process which comprises contacting a hydrocarbon charge under catalytic cracking conditions with the composition of claim 5.

8. A hydrocarbon conversion process according to claim 7, wherein said crystalline aluminosilicate exhibits shape selective cracking of straight chain hydrocarbons in a mixture of same with non-straight chain hydrocarbons.

References Cited
UNITED STATES PATENTS

| 3,033,778 | 5/1962 | Frilette | 208—120 |
| 3,386,801 | 6/1968 | Kuehl | 23—105 |
| 3,354,096 | 11/1967 | Young | 252—435 |
| 3,355,246 | 11/1967 | Kuehl | 252—435 |

DELBERT E. GANTZ, Primary Examiner

U.S. Cl. X.R.

252—435, 437, 455 Z